UNITED STATES PATENT OFFICE.

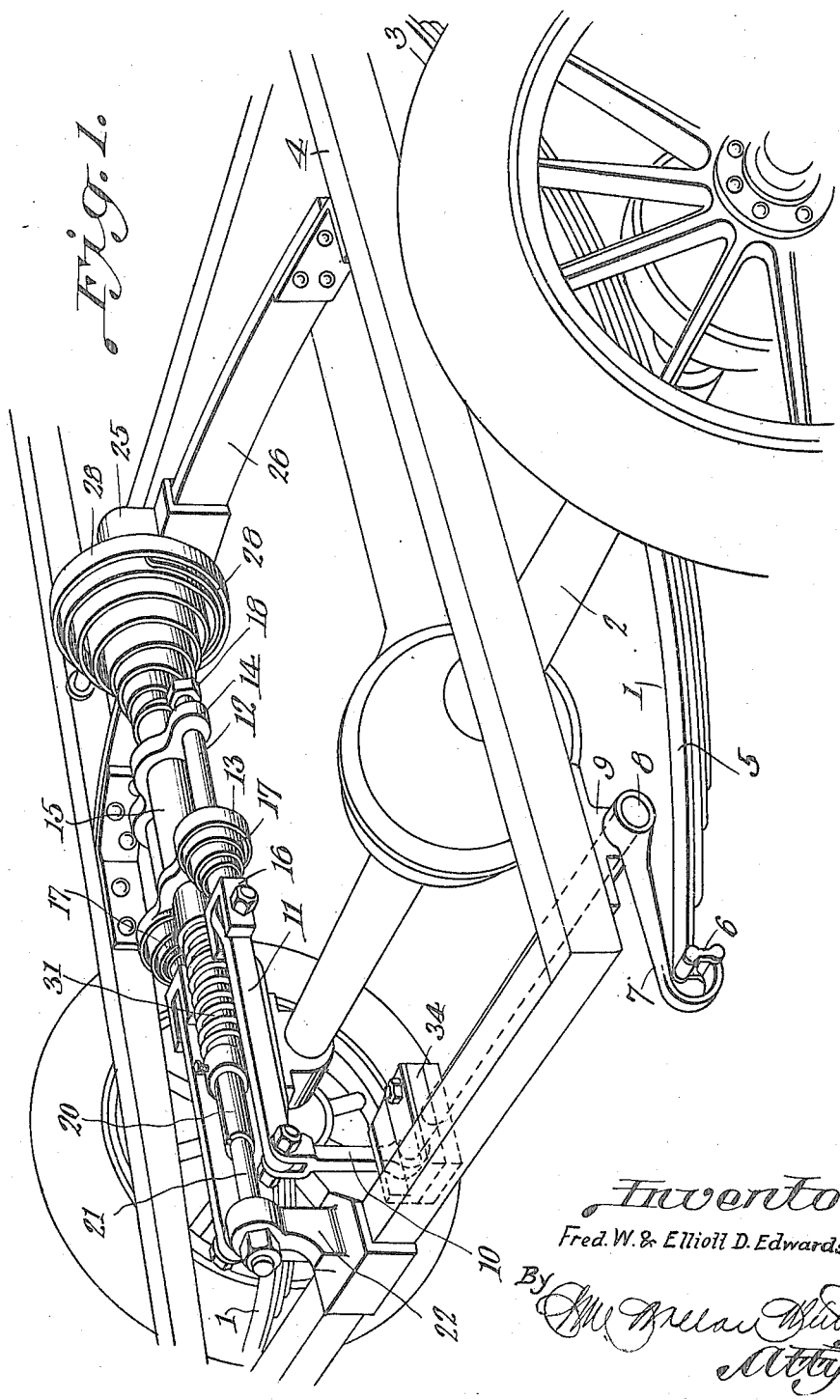

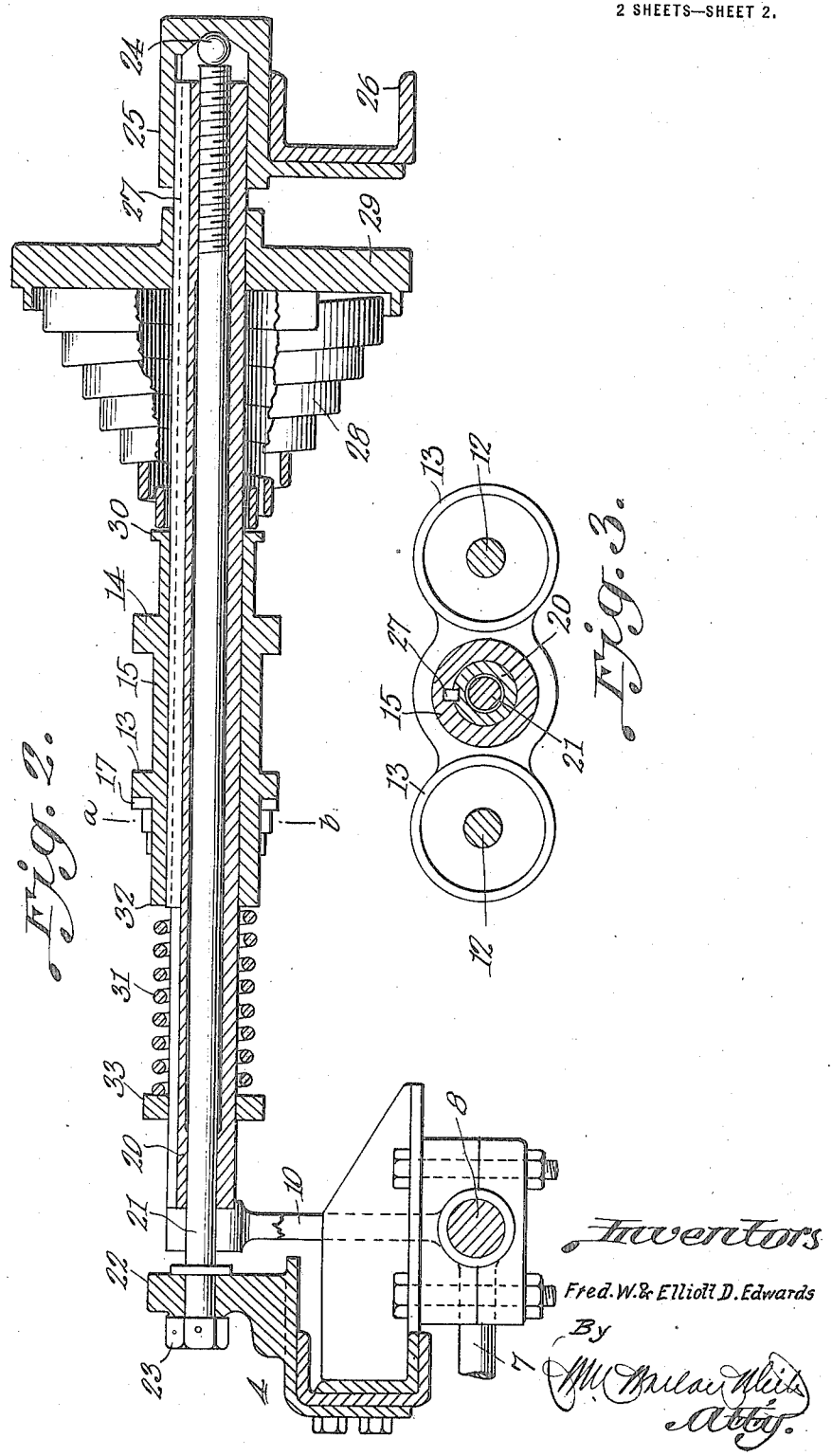

FREDERICK WILLIAM EDWARDS AND ELLIOTT DERHAM EDWARDS, OF SYDNEY, NEW SOUTH WALES, AUSTRALIA.

VEHICLE SUSPENSION DEVICE.

1,269,801.

Specification of Letters Patent.

Patented June 18, 1918.

Application filed November 21, 1916. Serial No. 132,624.

*To all whom it may concern:*

Be it known that we, FREDERICK WILLIAM EDWARDS and ELLIOTT DERHAM EDWARDS, subjects of the King of Great Britain and Ireland, residing, respectively, at 486 Kent street, Sydney, New South Wales, Australia, and with the Australian infantry forces on active service abroad, have invented new and useful Improvements in Vehicle Suspension Devices, of which the following is a specification.

This invention relates to suspension devices for vehicles, particularly motor road vehicles, and has for its object to provide means whereby the main leaf springs at either side of the vehicle will be caused to flex in unison and maintain a better balance of the chassis than when such main leaf springs flex independently of each other.

According to our system the rear part of the frame is carried by semi-elliptic main leaf springs, the forward eyes of which are mounted on eye brackets fixed to the frame, while the rear ends are shackled to crank arms, which crank arms are carried on separate transverse rock shafts in alinement with each other. The inner end of these rock shafts are fitted with levers which are link connected to guide plungers and operate through independent cushion springs on a slide head. Said slide head abuts a buffer spring having a tension adjustment and is also fitted with a reaction spring to take up rebound movements.

The slide head is not moved in obedience to small vibratory or oscillatory movements of either leaf spring which are absorbed in the cushion springs, but it is moved when the oscillatory movement of either of said side springs exceeds a predetermined value and its movement is resisted by the buffer spring. In any movements of the buffer spring due to the influence of either leaf spring, the leaf spring associated with the wheel on the other side of the vehicle is simultaneously relieved at its rear end, so that the chassis frame is subjected only to limited torsional stress since any considerable movement of either wheel is simultaneously relieved at the other side of the vehicle. The frame is therefore caused to remain substantially horizontal and is subjected to limited distortion only.

In the accompanying drawings Figure 1 is a perspective view of the rear portion of a motor chassis to which our invention is applied;

Fig. 2 is a longitudinal sectional elevation through the slide head and its springs, showing also portion of one of the rock lever cranks;

Fig. 3 is a transverse section at $a$—$b$ Fig. 2;

The half elliptic main leaf springs 1 are mounted on or underslung from the axle 2 according to existing practice, and their forward ends 3 are carried either on fixed eye brackets on the frame 4 or on pivot shackles or any other suitable carrier means. The rear ends 5 of the springs 1 are carried by shackles 6 hung on the ends of lever arms 7, which lever arms are keyed or otherwise fixed on the ends of the independent rock shafts 8 which are separately rotatable in suitable bearings 9 and 34 carried on the frame 4. At the inner end each of the rock lever shafts 8 carries a crank lever 10 and these crank levers are respectively connected by pivoted links 11 to the ends of two guide plungers 12. These plungers are movable longitudinally through the lugs 13 and 14 of the slide head 15, and there is interposed between the cross head 16 of each link plunger and the slide head lug 13 in which it slides, a cushion spring 17 preferably of the volute type. 18 are nuts fixed on the ends of the guide plungers 12 to limit their outward movement relatively to the slide head 15 by contacting with the lugs 14 on said head.

The slide head 15 is longitudinally movable but is nonrotatable on the tubular guide shaft 20. This tubular shaft is carried on a solid stem shaft 21, the rear end of which is rotatably supported in a bracket bearing 22 carried on the frame and it is fitted with a nut head 23 or other terminal by means of which it may be rotated by a key for adjustment purposes. The stem 21 is threaded at its fore end 23, and its thread engages the tapped end portion of the tubular guide shaft 20. The forward end of the stem 21 bears on a ball 24 or other footstep bearing carried in a bracket 25 supported on a transverse frame member 26. A long feather key 27 permits lengthwise adjustment of the guide shaft 20 relatively to the stem shaft 21 but prevents rotation of the guide shaft 20 in the bearing 25 and also prevents rotation of the slide head 15 on the guide shaft 20. 25 is the main buffer spring, (preferably of the volute type) contained between a disk 29 fixed to the tubular guide shaft 20, and the forward end 30 of the slide head 15. 31 is a rebound spring contained between the end 32 of the slide head 15 and a stop collar 33 adjustably mounted on the tubular slide shaft 20.

The cushion springs 17 are proportioned in relation to the tension of the buffer spring 28 to take care of minor vibrational and oscillatory movements communicated from the springs 1 without substantially moving the slide head 15 and stressing the buffer spring 28. When however any substantial movement of either of the wheels is transmitted through the lever and shaft system 7—8—10, and the link 11, to one of the cushion springs 17 so that said spring becomes nearly fully compressed, then the slide member 15 is stressed and moves forward, compressing the buffer spring 28. This allows the other of the cushion springs 17 to relieve the support of the leaf spring 1 on its side of the vehicle, so that on the other side of the vehicle as well as the side of it on which the movement originated, the frame is permitted to move simultaneously downward relative to the axle. The tension of the rebound spring 31 is adjusted by setting the collar 33 at an appropriate position on the tubular shaft 20, and the tension of the buffer spring 28 is adjusted to adapt the same to the load to be carried by turning the stem shaft 21 by means of a spanner applied to the nut head 23, thereby moving the tubular shaft 20 outward so as to carry with it the buffer and the cushion springs, or reversely to move it inward when it is desired to ease the spring tension. By the correct proportioning of the range of movement and resistance of each of the springs 17, 28 and 31, an effective balancing of oscillatory movements due to road inequalities is obtained, while also there is obtained relief against rebound movements and also "shock absorber" relief of the minor movements due to small road inequalities. The essence of the invention is the transmission of the movement of the rear ends of the main leaf springs through rock shafts to independent springs which have a small damping effect and act separately until stressed beyond a predetermined point, when both act conjointly to move a member which is supported by a buffer spring which also has a small damping factor and is fitted with a tension adjustment; the provision of a rebound spring being incidental to the objects mainly achieved by the construction described.

What we claim as our invention and desire to secure by Letters Patent is:

1. A rear wheel springing system for motor road vehicles wherein semi elliptic leaf springs have their forward eyes pivotally supported on the vehicle frame, comprising the combination of independent rock shafts, a lever fixed on each shaft and shackled to the rear end of one of the springs, a main buffer spring, a slide-head acting against the buffer spring, independent crank and link operative connections between the rock shafts and the slide-head, and cushion springs interposed in said connections, so constructed and arranged that minor road shocks are absorbed therein while axle movements of greater amplitude are transmitted through the slide head to the buffer spring, with the result that both side springs are caused to move simultaneously in the same direction.

2. Means for maintaining substantially transverse horizontality of the frame of a motor road vehicle irrespective of rear axle movement at either side of said frame, said means comprising in combination with side springs, a cranked rock shaft supporting the rear ends of either side spring, a slide head, independent connections from said rock shafts to the slide head, cushion springs between said connections and slide head, a buffer spring, means for adjusting the buffer spring, the buffer spring acting against said slide head, whereby major movement of either rock shaft effects movement of the slide head and relief of the rock shaft support at the opposite side of the frame so that both side springs are caused to move simultaneously in the same direction, substantially as herein described.

3. In a rear axle spring system of the type described, the combination with side springs attached at their forward ends to the vehicle frame, of a guide shaft, a slide head on the guide shaft, independent crank rock shafts connected to the rear ends of the side springs, plungers connected to the rock shafts and relatively movable on the slide head, cushion springs between the plungers and the slide head compressible by such relative movements thereby to set the plungers, and the slide head for movement as a unit, and a helical rebound spring on the guide shaft working against the slide head.

4. In a rear axle spring system of the type described, the combination with side springs attached at their forward ends to the vehicle frame, of a tubular guide shaft, a slide head on the guide shaft, independent operative connections between the rear ends of said springs and the slide head, cushion springs interposed in said operative connections, a main buffer spring fixed on the tubular guide shaft and against which the slide head is moved by the operative connections, and means for adjusting the tension of the main buffer spring comprising a screw stem shaft working in the tubular guide shaft, the tubular shaft having a tapped portion co-acting with the screw stem shaft, fixed end bearings for the stem shaft, and means to restrain the tubular shaft against rotation while permitting it to have axial movement on rotation of the stem shaft.

In testimony whereof we have signed our names to this specification in the presence of two subscribing witnesses.

FREDERICK WILLIAM EDWARDS.
ELLIOTT DERHAM EDWARDS.

Witnesses to signature of Frederick William Edwards:
A. B. CAMPBELL,
W. I. DAVIS.

Witnesses to the signature of Elliott Derham Edwards:
KEITH MERRILL,
W. W. PORJES.

Copies of this patent may be obtained for five cents each, by addressing the "Commissioner of Patents, Washington, D. C."